(12) United States Patent
Kouira

(10) Patent No.: US 8,711,376 B2
(45) Date of Patent: Apr. 29, 2014

(54) TERMINAL DEVICE AND IMAGE PRINTING METHOD

(75) Inventor: Toshitsugu Kouira, Kyoto (JP)

(73) Assignee: Murata Machinery Ltd., Kyoto-shi (JP)

(*) Notice: Subject to any disclaimer, the term of this patent is extended or adjusted under 35 U.S.C. 154(b) by 344 days.

(21) Appl. No.: 13/083,778

(22) Filed: Apr. 11, 2011

(65) Prior Publication Data

US 2011/0261382 A1 Oct. 27, 2011

(30) Foreign Application Priority Data

Apr. 26, 2010 (JP) ................................. 2010-101388

(51) Int. Cl.
*G06K 15/00* (2006.01)
*H04N 1/32* (2006.01)

(52) U.S. Cl.
CPC ..................................... *H04N 1/32* (2013.01)
USPC ......................................... 358/1.13; 709/223

(58) Field of Classification Search
USPC .......... 358/1.6, 1.8, 1.13, 400, 401, 1.16, 1.9; 709/223
See application file for complete search history.

(56) References Cited

U.S. PATENT DOCUMENTS

| 7,362,465 B2 * | 4/2008 | Nishikawa et al. .......... 358/1.16 |
| 8,284,413 B2 * | 10/2012 | Watanabe .................... 358/1.13 |
| 2005/0041261 A1 * | 2/2005 | Narushima et al. ............ 358/1.9 |
| 2006/0082825 A1 | 4/2006 | Lee |
| 2008/0021991 A1 * | 1/2008 | Kawai ........................... 709/223 |
| 2008/0170270 A1 * | 7/2008 | Watanabe ..................... 358/296 |

FOREIGN PATENT DOCUMENTS

| JP | 2004-246283 | 2/2004 |
| JP | 2005-024881 | 1/2005 |
| JP | 2009-076959 | 9/2009 |

OTHER PUBLICATIONS

Corresponding EP extended Search Report dated May 8, 2013 (EP application No. 11162822.8).

* cited by examiner

*Primary Examiner* — Jerome Grant, II
(74) *Attorney, Agent, or Firm* — Adli Law Group P.C.

(57) ABSTRACT

An image printing method to transmit a signal to an image printing device. The image printing device can be in either a normal print mode or a saving print mode, and maintains the selected print mode as standard mode information. The image printing method includes a step to obtain the standard mode information from the image printing device, a step to display a confirmation window including a print setting change button based on a user operation through a print start button while a print setting window including the print start button is displayed, a step to determine print settings for a print signal based on the standard mode information and a user operation through the print setting change button, and a step to generate the print signal including the determined print settings. The step to display the confirmation window determines whether the confirmation window is to be displayed or not based on the standard mode information.

12 Claims, 12 Drawing Sheets

FIG. 5

APPEARING PATTERN OF CONFIRMATION WINDOW

| NORMAL PRINT MODE | SAVING PRINT MODE |
|---|---|
| PRESS PRINT START BUTTON → CONFIRMATION WINDOW IS NOT DISPLAYED | PRESS PRINT START BUTTON → CONFIRMATION WINDOW IS DISPLAYED |

FIG. 11

APPEARING PATTERN OF CONFIRMATION WINDOW

| NORMAL PRINT MODE | SAVING PRINT MODE | | |
|---|---|---|---|
| NOT DISPLAYED | THERE IS A DISPLAY HISTORY OF SETTING CHANGE WINDOW | NO DISPLAY HISTORY OF SETTING CHANGE WINDOW | |
| | NOT DISPLAYED | THERE IS A CHANGE HISTORY | NO CHANGE HISTORY |
| | | DISPLAYED (SETTINGS ARE ALLOWED TO BE CHANGED) | DISPLAYED (SETTINGS ARE ALLOWED TO BE CHANGED) |

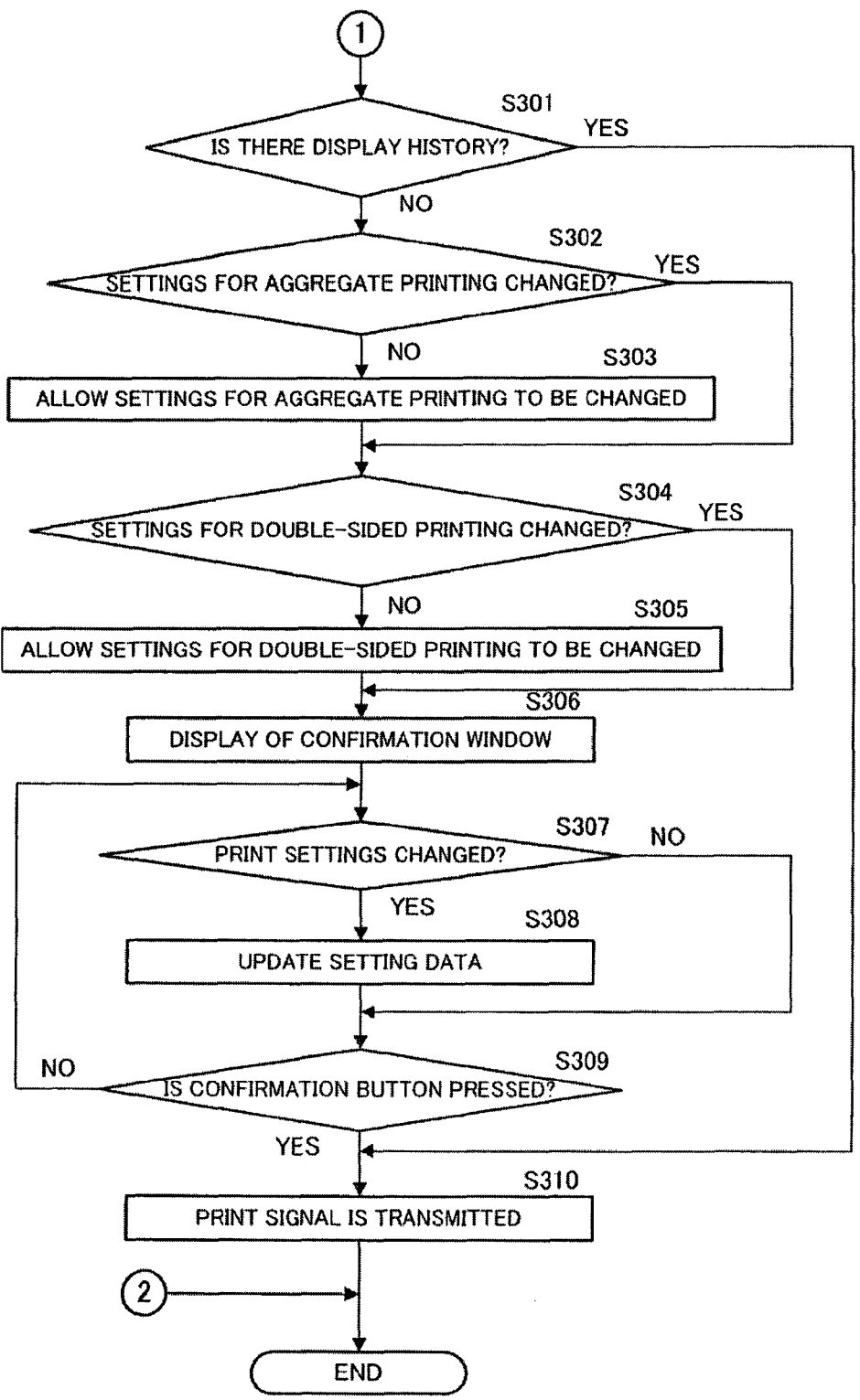

TERMINAL DEVICE AND IMAGE PRINTING METHOD

CROSS-REFERENCE TO RELATED APPLICATIONS

This application claims priority under 35 U.S.C. 119 to Japanese Patent Application No. 2010-101388, filed on Apr. 26, 2010, which application is hereby incorporated by reference in its entirety.

BACKGROUND OF THE INVENTION

1. Field of the Invention

The present invention relates to an improvement of a computer program executed in a terminal device arranged to transmit a print signal to an image printing device, in which either a normal print mode or a saving print mode may be selected. The saving print mode includes print settings which result in less paper consumption than the normal print mode. Further, the present invention relates to an improvement of a terminal device which executes the computer program.

2. Description of the Related Art

Most conventional printers have an aggregate print function which aggregates image data composed of plural pages and prints the aggregated image data on a single page, and a double-sided print function which prints image data composed of two pages on both sides of paper respectively. For example, these functions can be executed selectively. In the case of PC (personal computer) printing, which is executed by transmitting a print signal from a PC to a printer, print settings for aggregate printing, double-sided printing, and the like can be selected through a displayed property window. The property window is a setting change window that allows print settings to be changed, and is displayed by pressing a property button on a print setting window. The print signal includes image data to be printed and print settings, and is transmitted to the printer by pressing a print start button on the print setting window.

The aggregate printing and the double-sided printing can save paper consumed for printing compared with normal printing, which prints image data composed of plural pages on one side of paper in order, one page per sheet of paper. Recently, printers including the saving print mode, which automatically selects print settings of the aggregate printing, the double-sided printing, and the like, and performs printing, have been suggested in view of paper saving. However, with such a printer, for example, when a user wants to perform normal printing but is not aware of an existing saving print mode, or even if the user is aware of the saving mode but forgets to deactivate the saving mode, an undesirable printing would be performed against the user's intention, thereby resulting in a waste of paper consumption. Accordingly, in order to help the user's awareness of the saving print mode, a message indicating that the saving print mode is selected can be displayed on a displaying unit of the printer. However, in the case of PC printing which is executed remotely from the printer, the user likely cannot notice the display on the printer, thereby making it difficult to sufficiently prevent unintentional printing.

SUMMARY OF THE INVENTION

In order to overcome the problems described above, preferred embodiments of the present invention provide a terminal device and the like which can prevent unintentional printing from being executed, thereby saving paper. It is an object to provide a terminal device and the like which can prevent an image printing device from printing, in particular, while a user is not aware that the image printing device is in the saving print mode. It is another object to provide a terminal device and the like which allows print settings to be changed easily when the user notices the saving print mode.

The problems which the present invention aims to overcome have been described above, and methods to solve the problems and the effect of will be described.

A terminal device according to the present invention is configured to transmit a print signal to an image printing device. The terminal device includes a mode information obtaining unit, a confirmation window displaying unit, a print setting determining unit, a print signal generating unit. The mode information obtaining unit obtains standard mode information from the image printing device. The confirmation window displaying unit is configured to display a confirmation window including a first print setting change button based on a user operation through a print start button while a print setting window including the print start button is displayed. The print setting determining unit determines print settings for a print signal based on the standard mode information and a user operation through the first print setting change button. The print signal generating unit generates the print signal having print settings determined by the print setting determining unit. The standard mode information is information representing a print mode selected by the user, is the print mode being either the normal print mode including predetermined print settings, or the saving print mode including print settings in which less paper is consumed than in the normal print mode. The confirmation window displaying unit determines whether to display the confirmation window or not based on the standard mode information.

An image printing method according to the present invention is performed in the terminal device configured to transmit a print signal to the image printing device. The image printing method includes a mode information obtain step, a confirmation window display step, a print setting determine step, and a print signal generate step. The mode information obtain step is to obtain standard mode information from the image printing device. The confirmation window display step is to display a confirmation window including a first print setting change button, based on a user operation through a print start button while a print setting window including the print start button is displayed. The print setting determine step is to determine print settings for a print signal based on the standard mode information and a user operation through the first print setting change button. The print signal generate step is to generate the print signal including the print settings determined in the print setting determine step. The standard mode information is information representing a print mode selected by the user, is the print mode being either the normal print mode including predetermined print settings, or the saving print mode including print settings in which less paper is consumed than in the normal print mode. The confirmation window display step determines whether the confirmation window is to be displayed or not based on the standard mode information.

A medium according to the present invention is a non-transitory medium in which a computer program is stored, the computer program being executable in the terminal device configured to transmit a print signal to the image printing device. The computer program causes the terminal device to perform a mode information obtain step, a confirmation window display step, a print setting determine step and a print signal generate step. The mode information obtain step is to obtain standard mode information from the image printing device. The confirmation window display step is to display a confirmation window including a first print setting change button, based on a user operation through a print start button while a print setting window including the print start button is displayed. The print setting determine step is to determine print settings for a print signal based on the standard mode information and a user operation through the first print setting change button. The print signal generate step is to generate the print signal including the print settings determined in the print setting determine step. The standard mode information is information representing a print mode selected by the user, is the print mode being either the normal print mode including predetermined print settings, or the saving print mode including print settings in which less paper is consumed than in the normal print mode. The confirmation window display step determines whether the confirmation window is to be displayed or not based on the standard mode information.

A computer program according to the present invention is a computer program executable in the terminal device configured to transmit a print signal to the image printing device. The computer program causes the terminal device to perform a mode information obtain step, a confirmation window display step, a print setting determine step and a print signal generate step. The mode information obtain step is to obtain standard mode information from the image printing device. The confirmation window display step is to display a confirmation window including a first print setting change button, based on a user operation through a print start button while a print setting window including the print start button is displayed. The print setting determine step is to determine print settings for a print signal based on the standard mode information and a user operation through the first print setting change button. The print signal generate step is to generate the print signal including the print settings determined in the print setting determine step. The standard mode information is information representing a print mode selected by the user, the print mode being either the normal print mode including predetermined print settings, or the saving print mode including print settings in which less paper is consumed than in the normal print mode. The confirmation window display step determines whether the confirmation window is to be displayed or not based on the standard mode information.

According to the present invention, the confirmation window including the first print setting change button is displayed based on a user operation through the print start button while the print setting window is displayed. Whether the confirmation window is displayed or not is determined based on the standard mode information obtained from the image printing device and, therefore, it is possible for the user to recognize whether the image printing device is in the saving print mode or not through the display of the confirmation window when the user presses the print start button. Consequently, it is possible to prevent the image printing device from printing while the user is not aware of the saving print mode. Further, since print settings for a print signal are determined based on a user operation through the first print setting change button on the confirmation window, it is also possible for the user to easily change the print settings when noticing the saving print mode.

A terminal device according to a second aspect of the present invention further includes a setting change window displaying unit and a display history storing unit. The setting change window display unit displays a setting change window which allows the print settings to be changed, based on a user operation through a second print setting change button arranged on the print setting window. The display history storing unit stores a display history of the displayed setting change window. The confirmation window displaying unit determines whether to display the confirmation window or not based on the display history of the setting change window during the time between when the print setting window is displayed and the user operation through the print start button.

An image printing method according to a second aspect of the present invention further includes a setting change window display step and a display history memory step. The setting change window display step is to display a setting change window which allows the print settings to be changed based on a user operation through a second print setting change button arranged on the print setting window. The display history memory step is to maintain a display history of the displayed setting change window. The confirmation window display step determines whether the confirmation window is to be displayed or not based on the display history of the setting change window during the time between when the print setting window is displayed and the user operation through the print start button.

According to such a configuration, since the setting change window is displayed based on a user operation through the second print setting change button on the print setting window and the confirmation window is displayed based on the display history, it is possible to determine whether the confirmation window is to be displayed or not according to the display history of the setting change window.

In a terminal device according to a third aspect of the present invention, the confirmation window displaying unit does not display the confirmation window if the setting change window had been displayed by the time of the user operation through the print start button, after the print setting window is displayed.

In an image printing method according to a third aspect of the present invention, the confirmation window display step does not display the confirmation window if the setting change window had been displayed by the time of the user operation through the print start button, after the print setting window is displayed.

According to such a configuration, it is possible to prevent the confirmation window from being displayed even when the image printing device is in the saving print mode.

A terminal device according to a forth aspect of the present invention further includes a change history storing unit configured to maintain a change history of the print settings. The confirmation window displaying unit displays the confirmation window based on the change history.

An image printing method according to a forth aspect of the present invention further includes a change history memory step to maintain a change history of the print settings. The confirmation window display step displays the confirmation window based on the change history.

According to such a configuration, it is possible to display the confirmation window according to the change history of the print settings.

In a terminal device according to a fifth aspect of the present invention, the displayed confirmation window includes a message indicating that the saving print mode is selected for the image printing device.

In an image printing method according to a fifth aspect of the present invention, the displayed confirmation window includes a message indicating that the saving print mode is selected for the image printing device.

According to such a configuration, it is possible to notify the user that the image printing device is in the saving print mode through the display of the confirmation window.

According to the present invention, since whether the confirmation window is to be displayed or not is determined based on the standard mode information obtained from the image printing device, it is possible for the user to recognize whether the image printing device is in the saving print mode through the display of the confirmation window. Consequently, it is possible to prevent the image printing device from printing while the user is not aware of the saving print mode. Thus, it is possible to prevent undesirable printing and, thereby, resulting in less paper consumption. Further, since print settings for a print signal are determined based on a user operation through the first print setting change button on the confirmation window, it is also possible for the user to easily change the print settings when noticing the saving print mode.

Other features, elements, processes, steps, characteristics and advantages of the present invention will become more apparent from the following detailed description of preferred embodiments of the present invention with reference to the attached drawings.

BRIEF DESCRIPTION OF THE DRAWINGS

FIG. 5 illustrates an example of operations of the terminal device 20 of FIG. 4 during printing, and illustrates an appearing pattern indicating whether a confirmation window 60 is displayed or not.

FIG. 11 illustrates an example of operations of the terminal device 20 of FIG. 9 during printing, and illustrates an appearing pattern indicating whether the confirmation window 60 is displayed or not.

FIG. 12 is a flow chart illustrating an example of operations of the terminal device 20 of FIG. 9 in the saving print mode.

DETAILED DESCRIPTION OF PREFERRED EMBODIMENTS

Embodiment 1 <Printing System>

Figure 1:
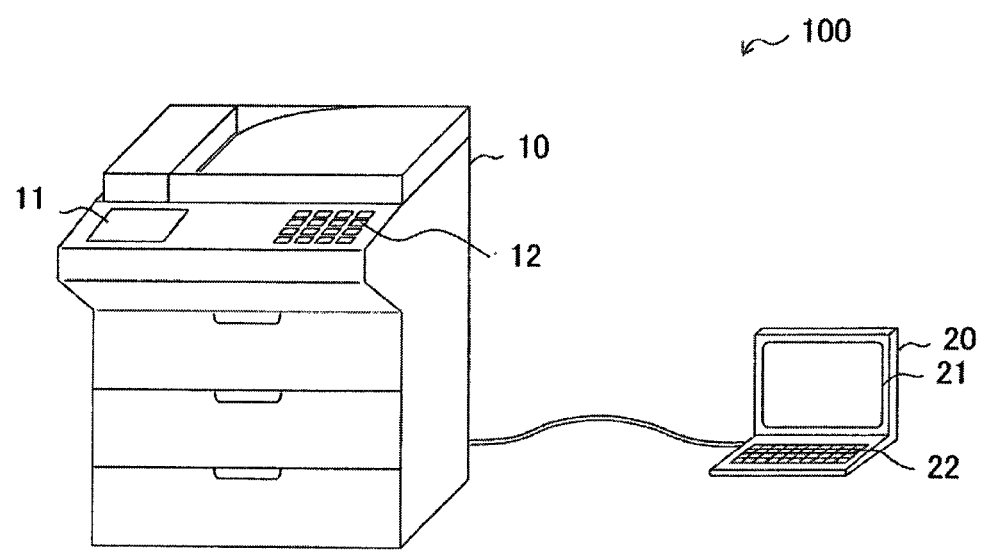
FIG. 1 is a system diagram illustrating an example of a configuration of a printing system 100 including a terminal device 20 which operates based on a computer program according to Embodiment 1 of the present invention.

FIG. 1 is a system diagram illustrating an example of a configuration of a printing system 100 including a terminal device 20 which operates based on a computer program according to Embodiment 1 of the present invention. The printing system 100 includes a multifunction peripheral (MFP) 10 and the terminal device 20. A print signal including, for example, image data to be printed, print setting data representing print conditions and the like, is transmitted from the terminal device 20 to the MFP 10, and printing of the image data is executed.

The MFP 10, including a scanner function, a print function, a facsimile function and a reproducing function, is an image printing device, which can perform these functions selectively. The MFP 10 is arranged with a display 11 and an operation unit 12. The display 11 displays the state of an operation, contents of a process, and the like, and the operation unit 12 has operation keys including a start key for starting a process such as document sending, a stop key for cancelling a process, and numeric keys for entering numbers.

The terminal device 20 is an information processing terminal such as a PC or the like, which communicates with the MFP 10, generates a print signal including document data, which includes image data composed of plural pages, and print setting data, and transmits the print signal to the MFP 10. The terminal device 20 is arranged with a display 21 and an operation unit 22. The display 21 displays, for example, a print setting window which allows print settings to be configured. Based on the use of the operation unit 22, the terminal device 20 can instruct the MFP 10 to start a printing process.

The terminal device 20 operates based on a computer program such as a printer driver, and generates print setting data based on user operation while running the computer program. A print signal is then transmitted from the terminal device 20 to the MFP 10.

<Image Printing Device>

Figure 2:
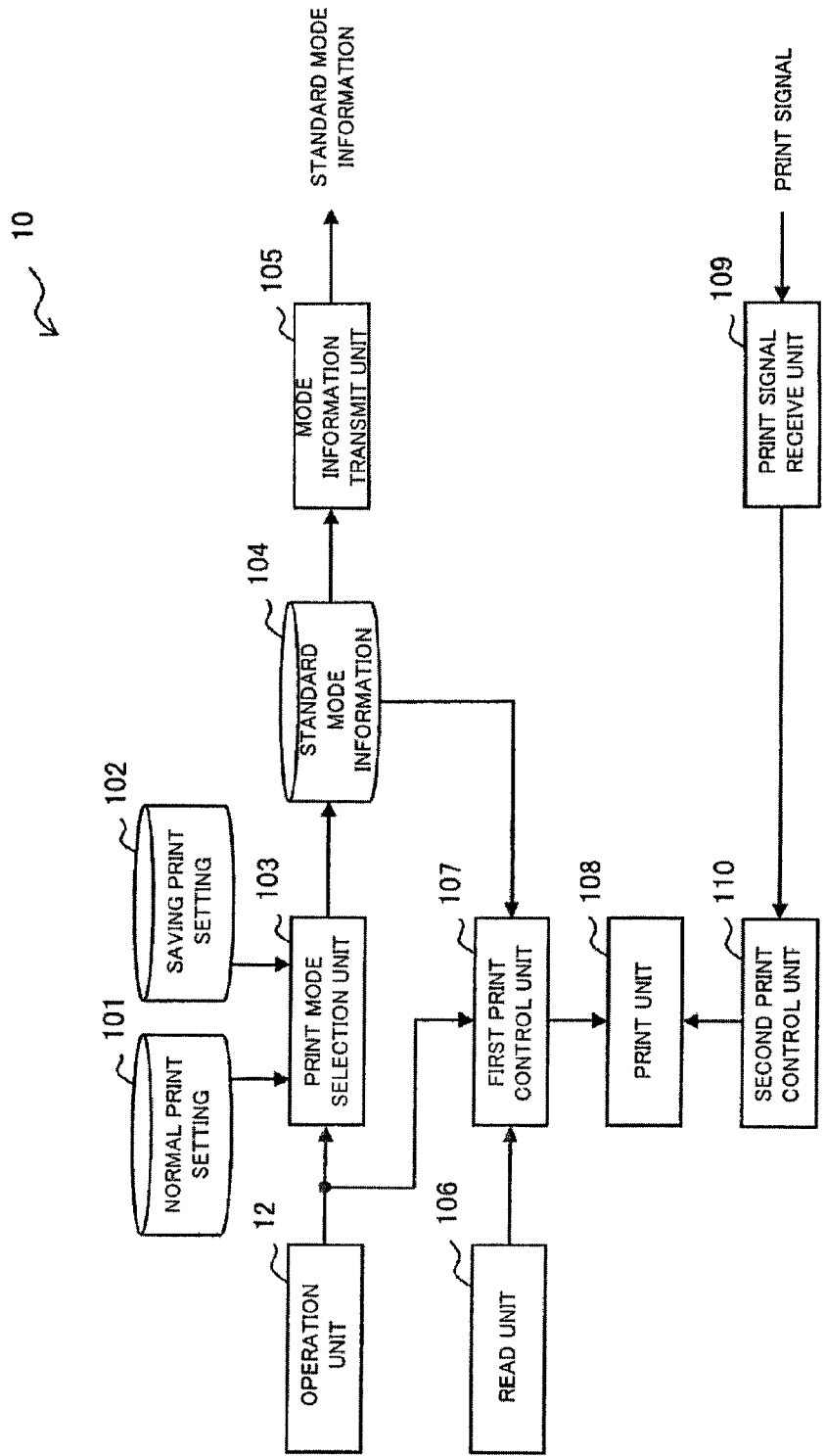
FIG. 2 is a block diagram illustrating an example of a configuration of a multifunction peripheral 10 in the printing system 100 of FIG. 1, and illustrates an example of a functional configuration in the MFP 10.

FIG. 2 is a block diagram illustrating an example of a configuration of the MFP 10 in the printing system 100 of FIG. 1 and illustrates an example of a functional configuration in the MFP 10. The MFP 10 includes the operation unit 12, a normal print setting memory unit 101, a saving print setting memory unit 102, a print mode selection unit 103, a standard mode information memory unit 104, a mode information transmit unit 105, a read unit 106, a first print control unit 107, a print unit 108, a print signal receive unit 109, and a second print control unit 110.

As its print mode, the MFP 10 can be selected to be in either the normal print mode or the saving print mode based on user selection. The MFP 10 then maintains the selected print mode as standard mode information. The normal print mode includes predetermined print settings, and the printing process is performed based on setting data held in the normal print setting memory unit 101.

In contrast, the saving print mode is a print mode that includes predetermined print settings in which less paper is consumed than in the normal print mode. The printing process is performed based on setting data held in the saving print setting memory unit 102. Such print settings may be aggregate printing, double-sided printing, or the like. Each setting data of the normal printing and the saving printing is registered in advance based on user operation.

The print mode selection unit 103 selects either the normal print mode or the saving print mode based on an entry signal from the operation unit 12, and retrieves setting data of the selected print mode from the print setting memory unit, such that the selected print mode may be written into the standard mode information memory unit 104 as the standard mode.

In the MFP 10, when performing a printing process in response to inputs through the operation keys on the operation unit 12, the printing process is performed based on the standard mode information in the standard mode information memory unit 104. On the other hand, when performing the printing process in response to an instruction from the terminal device 20, the printing process is performed based on print settings included in the print signal.

The read unit 106 generates a read image by optically reading a document, and outputs the generated image to the first print control unit 107. The print signal receive unit 109 is a receiving unit that receives a print signal from the terminal device 20, and outputs print setting data and document data included in the print signal to the second print control unit 110. The print unit 108 prints the read image or the image data included in the print signal on paper.

The first print control unit 107 is a control unit that controls the print unit 108 based on an entry signal from the operation unit 12, and causes the print unit 108 to perform a printing process of the read image based on the standard mode information in the standard mode information memory unit 104.

The second print control unit 110 is a control unit that controls the print unit 108 based on a receive signal from the print signal receive unit 109, and causes the print unit 108 to perform a printing process of the document data based on the print setting data. The mode information transmit unit 105 is a transmission method that retrieves standard mode information from the standard mode information memory unit 104 and transmits the standard mode information to the terminal device 20. For example, the standard mode information is transmitted to the terminal device 20 based on a mode information request from the terminal device 20. The mode information transmit unit 105 and the print signal receive unit 109 include, for example, a network controller that communicates with devices on a communication network such as a LAN (local area network).

The terminal device 20 uses the standard mode information obtained from the MFP 10 as default print settings and determines the print mode of the MFP 10 based on the standard mode information, so as to generate a screen display according to the print mode.

<Print Setting Window, Property Window, and Confirmation Window>

Figure 3:
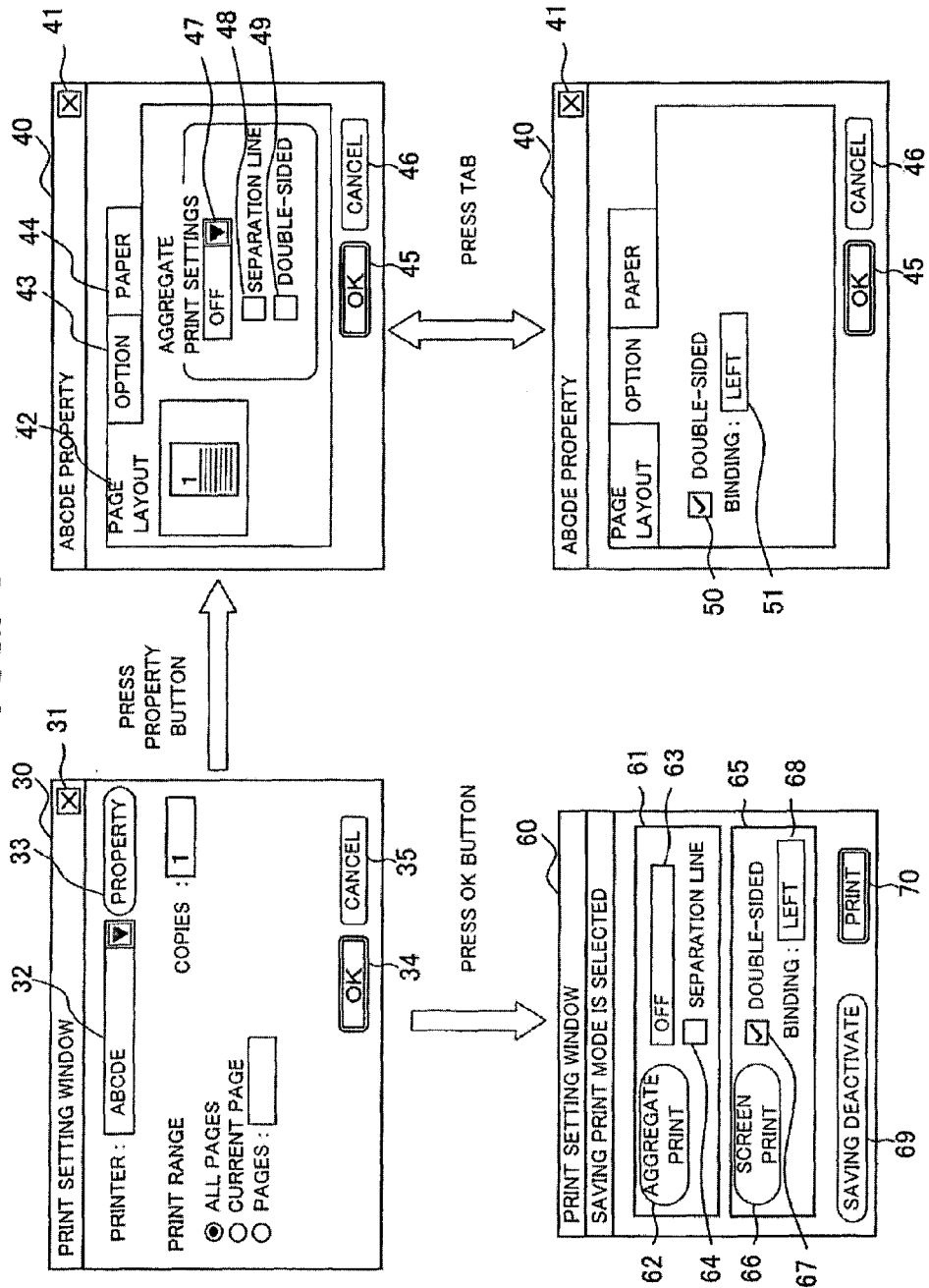
FIG. 3 illustrates an example of operations of the terminal device 20 in the printing system 100 of FIG. 1 during printing, and illustrates window transitions while a print setting window 30 is displayed.

FIG. 3 is a diagram illustrating an example of operations of the terminal device 20 in the printing system 100 of FIG. 1 during printing, and illustrates window transitions when the print setting window 30 is displayed. The print setting window 30 is a setting window that allows a printer driver to be selected and print settings to be configured. The print settings here are those which do not depend on the types of the printer driver. The print setting window 30 is displayed on the display 21 upon pressing a print setting start button on an application window.

The print setting window 30 includes cancel buttons 31, 35, a select field 32 for the printer driver, a property button 33, a print start button 34, entry fields for print range setting and print copies setting, and the like. The cancel buttons 31, 35 are operation icons for invalidating information related to print settings changed during the time between when the print setting window 30 is displayed and when the cancel button 31 or 35 is pressed, so as to end the print setting process and return to the original application window. The select field 32 is an entry field which allows a printer driver corresponding to a printer name to be selected and maintained.

The property button 33 is an operation icon for displaying the property window 40 so as to configure print settings which depend on the types of the printer driver. The print start button 34 is an operation icon for confirming print settings and causing a print signal to be transmitted, and is displayed as "OK". In this regard, when the MFP 10 is in the normal print mode, the print start button 34, upon being pressed, confirms the print setting and the print signal is thus transmitted. On the other hand, when the MFP 10 is in the saving print mode, the confirmation window 60 is displayed when the print start button 34 is pressed.

The property window 40 is a setting window that allows configuration of print settings which depend on the types of the printer driver, and is displayed on the print setting window 30 when the property button 33 on the print setting window 30 is pressed. The property window 40 includes cancel buttons 41, 46, a page layout setting tab 42, an option setting tab 43, a paper setting tab 44, a property setting finish button 45, and the like.

The cancel buttons 41, 46 are operation icons for invalidating information related to print settings changed during the time between when the property window 40 is displayed and when the cancel button 41 or 46 is pressed, so as to return to the original print setting window 30.

The page layout setting tab 42 is an operation icon for switching to a window display for configuring print settings related to a page layout. The option setting tab 43 is an operation icon for switching to a window display for configuring option settings. The paper setting tab 44 is an operation icon for switching to a window display for configuring print settings related to paper.

The property setting finish button 45 is an operation icon that causes a return to the original print setting window 30. When the page layout setting tab 42 is selected, print settings for aggregate printing can be configured and, for example, a select field 47 for aggregate print settings, a select field 48 for separator line printing, a select field 49 for double-sided printing and the like are displayed.

In the select field 47, a selection can be made with respect to settings for a non-selection for aggregate printing, for printing image data composed of two pages on a single sheet of paper, for printing image data composed of four pages on a single sheet of paper, and the like. In the select field 48, a selection can be made with respect to settings for printing separation lines between image data of each page. In the select field 49, a selection can be made with respect to aggregate and double-sided print settings for printing image data composed of plural pages on both sides of paper.

When the option setting tab 43 is selected, print settings for double-sided printing can be configured, and a select field 50 for double-sided print settings, a select field 51 for binding, and the like are displayed. In the select field 50, a selection can be made with respect to double-sided print settings for printing image data composed of two pages respectively on both sides of paper. In the select field 51, a selection can be made with respect to settings for forming a binding margin on the left side of paper or on the right side of paper and the like.

In the property window 40, contents of the present settings for saving printing, such as the aggregate printing and the double-sided printing, can be confirmed and changed as necessary.

The confirmation window 60 is an indication window for notifying a user that the MFP 10 is in the saving print mode, and is displayed on the display 21 if the print start button 34 in the print setting window 30 is pressed when the MFP 10 is in the saving print mode. If the MFP 10 is in the normal print mode, even when the print start button 34 is pressed, the confirmation window 60 would not be displayed, and the print signal would be transmitted.

The confirmation window 60 includes a display field 61 for aggregate print settings, a display field 65 of double-sided print settings, a print setting change button 69, a confirmation button 70, and the like. The display field 61 includes a change button 62 for the aggregate print settings, display fields 63 and 64 for the present print settings for the aggregate printing, and the like. The change button 62 is an operation icon for changing print setting for the aggregate printing. By pressing the change button 62, the window changes to, for example, the same window as the time of selecting the page layout setting tab 42 on the property window 40 so that it is possible to change the aggregate print settings.

The display field 65 includes a change button 66 for double-sided print settings, display fields 67 and 68 for the present print settings for the double-sided print settings, and the like. The change button 66 is an operation icon for changing print settings for the double-sided printing. By pressing the change button 66, the window changes to, for example, the same window as the time of selecting the option setting tab 43 on the property window 40 so that it is possible to change the double-sided print settings.

The print setting change button 69 is an operation icon for changing print settings for the saving printing and is displayed as "paper saving deactivation". By pressing the print setting change button 69, settings for the aggregate printing and the double-sided printing may be changed into non-selection. The confirmation button 70 is an operation icon for confirming print settings and causing the print signal to be transmitted, and is displayed as "print".

<Terminal Device>

Figure 4:
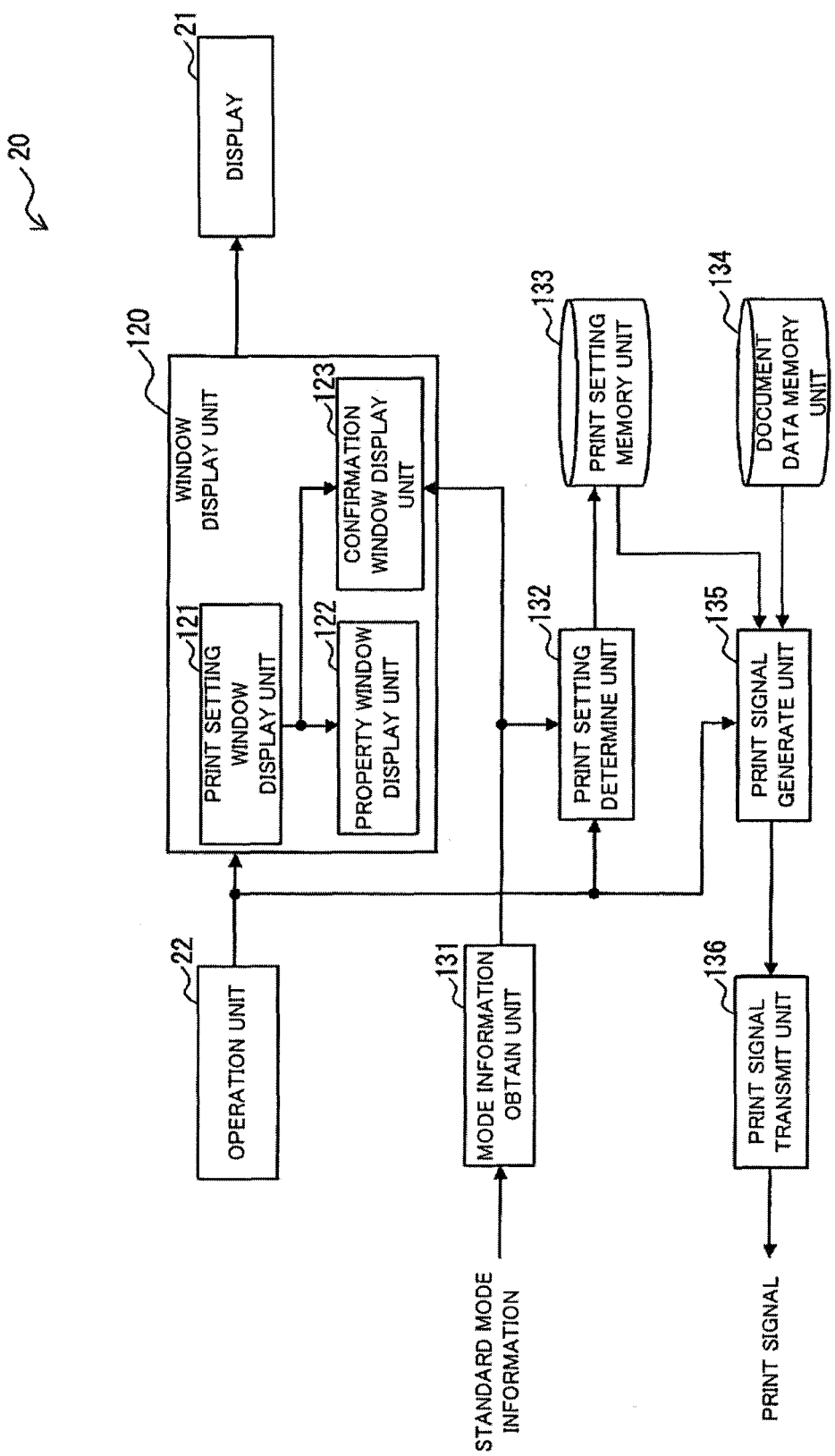
FIG. 4 is a block diagram illustrating an example of a configuration of the terminal device 20 in the printing system 100 of FIG. 1, and illustrates an example of a functional configuration in the terminal device 20.

FIG. 4 is a block diagram illustrating an example of a configuration of the terminal device 20 in the printing system 100 of FIG. 1, and illustrates an example of a functional configuration in the terminal device 20. The terminal device 20 includes the display 21, the operation unit 22, a window display unit 120, a mode information obtain unit 131, a print setting determine unit 132, a print setting memory unit 133, a document data memory unit 134, a print signal generate unit 135, and a print signal transmit unit 136.

The window display unit 120 includes a print setting window display unit 121, a property window display unit 122 and a confirmation window display unit 123. The window display unit 120 generates a predetermined window to be displayed on the display 21 based on an entry signal from the operation unit 22.

The print setting window display unit 121 displays the print setting window 30 including the print start button 34 and the property button 33, based on a user operation while an application program is running. The print setting window 30 is an entry window which allows a printer driver to be selected and allows print settings which do not depend on the types of the printer driver to be configured. For example, these print settings may include print range settings and print copies settings. The print setting window 30 is displayed by the running application program. The print setting window 30 is displayed, for example, when a print setting start button (icon) arranged on an application window is pressed.

Both the print start button 34 and the property button 33 are icons for executing functions assigned to the respective buttons when selected by the operation keys. The print start button 34 and the property button 33 are arranged individually on the print setting window 30.

The property window display unit 122 displays the predetermined property window 40 in response to the user pressing the property button 33 on the print setting window 30. The property window 40 is an entry window which allows the configuration of print settings which depend on the types of the printer driver, and is displayed according to the printer driver selected on the print setting window 30.

A computer program according to the embodiment could be a printer driver as described above, or an independent application program, which is supplied separately from the printer driver. Or, it could be configured so that a part of the program functions as the printer driver and another part thereof obtains standard mode information from the MFP 10 and writes the standard mode information onto a data file in the printer driver such as an INI file maintaining various setting data, and then the printer driver retrieves the standard mode information from the data file.

Print settings which depend on the types of the printer driver could be the aggregate print settings, the double-sided print settings, and the like. In these settings, print settings designated by the standard mode information obtained from the MFP 10 is previously designated as default print settings and displayed on the property window 40. Accordingly, the property window 40 is a setting change window for changing print settings based on the user operation, and the property button 33 is a print setting change button.

The mode information obtain unit 131 obtains standard mode information from the MFP 10 and outputs the obtained standard mode information to the confirmation window display unit 123. The standard mode information is obtained on a regular basis, for example, by transmitting predetermined mode information requests at regular time intervals to the MFP 10.

The confirmation window display unit 123 displays the confirmation window 60 including the print setting change button 69 and the confirmation button 70 in response to the user pressing the print start button 34 while the print setting window 30 is displayed. The confirmation window 60 is an indication window for notifying the user that the MFP is in the saving print mode. Whether the confirmation window 60 is to be displayed or not is determined based on the standard mode information obtained from the MFP 10. That is, the confirmation window display unit 123 displays the confirmation window 60 if the MFP is in the saving print mode, and does not display the confirmation window 60 if the MFP 10 is in the normal print mode, even when the print start button 34 is pressed.

Both the print setting change button 69 and the confirmation button 70 are icons for executing functions assigned to the respective buttons when selected by operation keys and the like. The print setting change button 69 and the confirmation button 70 are arranged individually on the confirmation window 60. Such a confirmation window 60 is displayed according to the printer driver selected on the print setting window 30, and includes a message and the like indicating that the saving print mode is selected for the MFP 10.

The print setting determine unit 132 determines print settings for a print signal. Such a determination is made based on the standard mode information obtained from the MFP 10, whether or not the print start button 34 is pressed while the print setting window 30 is displayed, and whether or not the print setting change button 69 or the confirmation button 70 is pressed while the confirmation window 60 is displayed. For example, if the print start button 34 is pressed with no change to the print settings after the print setting window 30 is displayed, the default print settings based on the standard mode information directly becomes the print settings for a print signal.

By contrast, if the print settings have been changed while displaying the property window 40 after the print setting window 30 is displayed, the changed print settings become the print settings for the print signal. Further, if the confirmation button 70 is pressed without first pressing the print setting change button 69 after the confirmation window 60 is displayed, the print settings at the start of the display of the confirmation window 60 becomes the print settings for the print signal. By contrast, if the print settings have been changed by pressing the print setting change button 69 after the confirmation window 60 is displayed, the changed print settings become the print settings for the print signal.

The print setting memory unit 133 maintains print setting data determined by the print setting determine unit 132. The document data memory unit 134 maintains document data to be printed. The document data includes, for example, image data composed of plural pages.

The print signal generate unit 135 generates a print signal based on the print setting data in the print setting memory unit 133 and the document data in the document data memory unit 134, in response to the user pressing the print start button 34 on the on the print setting window 30 or in response to the user pressing the confirmation button 70 on the confirmation window 60, and outputs the print signal to the print signal transmit unit 136. The print signal transmit unit 136 is a transmitting unit that transmits the print signal from the print signal generate unit 135 to the MFP 10.

<Appearing Pattern of the Confirmation Window>

FIG. 5 is a diagram illustrating an example of operations of the terminal device 20 of FIG. 4 during printing, and illustrates an appearing pattern indicating whether the confirmation window 60 is displayed or not. The confirmation window 60 is to be displayed at the time when the print start button 34 on the print setting window 30 is pressed. At this time, whether the confirmation window 60 is displayed or not is determined based on either the normal print mode or the saving print mode as the print mode.

If the print mode is the normal print mode, even when the print start button 34 is pressed, the confirmation window 60 would not be displayed, and the print signal is thus transmitted immediately. By contrast, if the print mode is the saving print mode, when the print start button 34 is pressed, the confirmation window 60 would be displayed. When the confirmation button 70 on the confirmation window 60 is pressed while the confirmation window 60 is displayed, the print signal is transmitted.

<Normal Print Mode>

Figure 6:
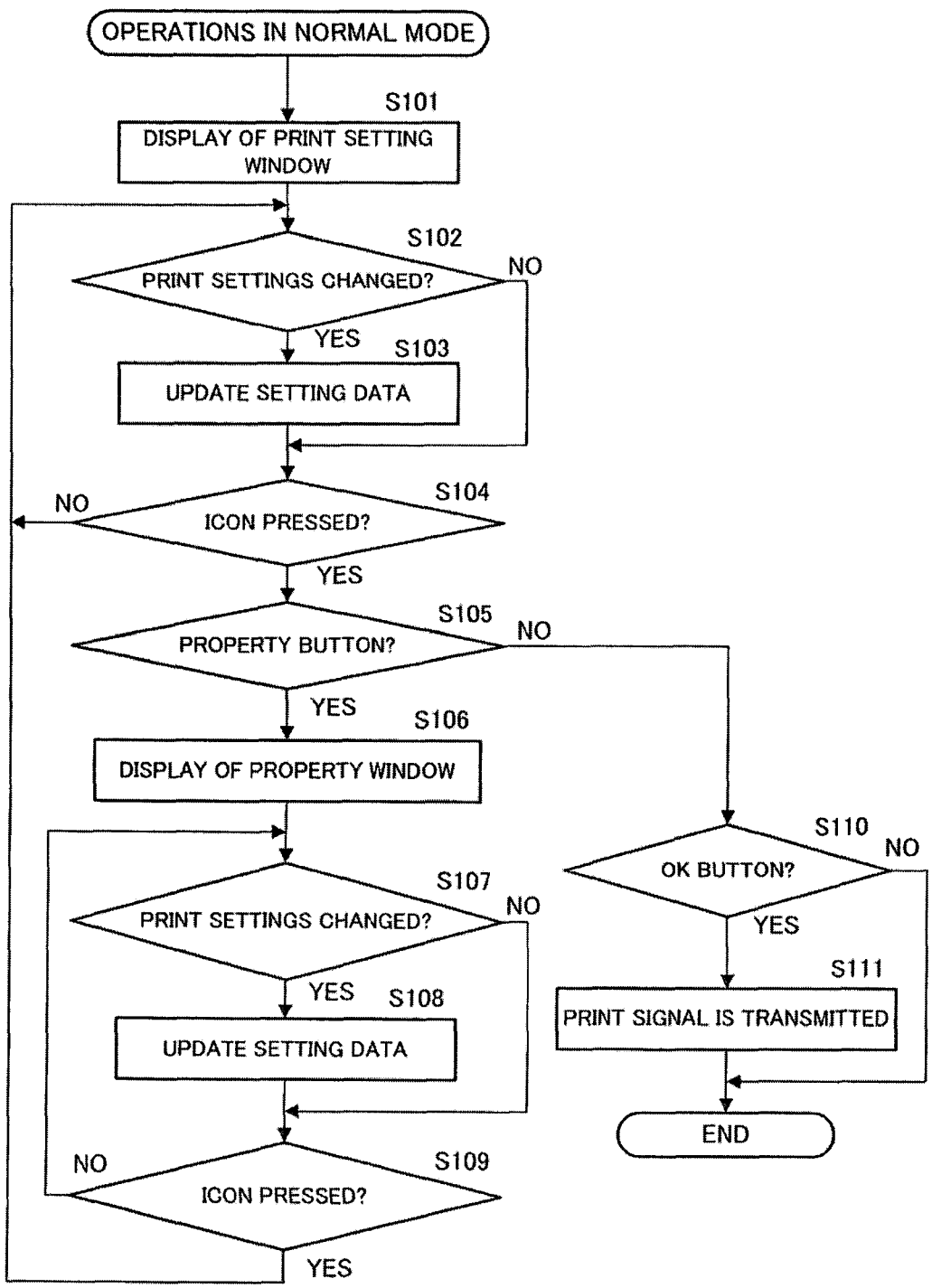
FIG. 6 is a flow chart illustrating an example of operations of the terminal device 20 of FIG. 4 in the normal print mode.

A flow chart of steps S101 through S111 of FIG. 6 illustrates an example of operations of the terminal device 20 of FIG. 4 in the normal print mode. At first, the print setting window display unit 121 displays the print setting window 30 if the print setting start button is pressed (step S101). At this time, the print setting determine unit 132 updates setting data if print settings are changed on the print setting window 30 (steps S102, S103).

Next, the property window display unit 122 displays the property window 40 if the property button 33 is pressed (steps S104 through S106). At this time, the print setting determine unit 132 updates the setting data if the print settings are changed on the property window 40 (steps S107, S108).

The print setting determine unit 132 repeats the process of steps S107 and S108 until the property setting finish button 45 or cancel buttons 41, 46 on the property window 40 is pressed (step S109). When the property setting finish button 45 is pressed, the original print setting window 30 returns and the process following S102 is repeated. By contrast, when the cancel button 41 or 46 is pressed, the print setting determine unit 132 invalidates information related to the print settings changed during the time between when the property window 40 is displayed and when the cancel button 41 or 46 is pressed and returns to the original print setting window 30.

Further, when the print start button 34 on the print setting window 30 is pressed (steps S104, S105, S110), the print setting determine unit 132 determines print settings, and a print signal is transmitted (step S111). By contrast, if the cancel buttons 31 or 35 on the print setting window 30 is pressed, the print setting determine unit 132 invalidates information related to the print settings changed during the time between when the print setting window 30 is displayed and when the cancel button 31 or 35 is pressed, and the print setting process ends.

<Saving Print Mode>

Figure 7:
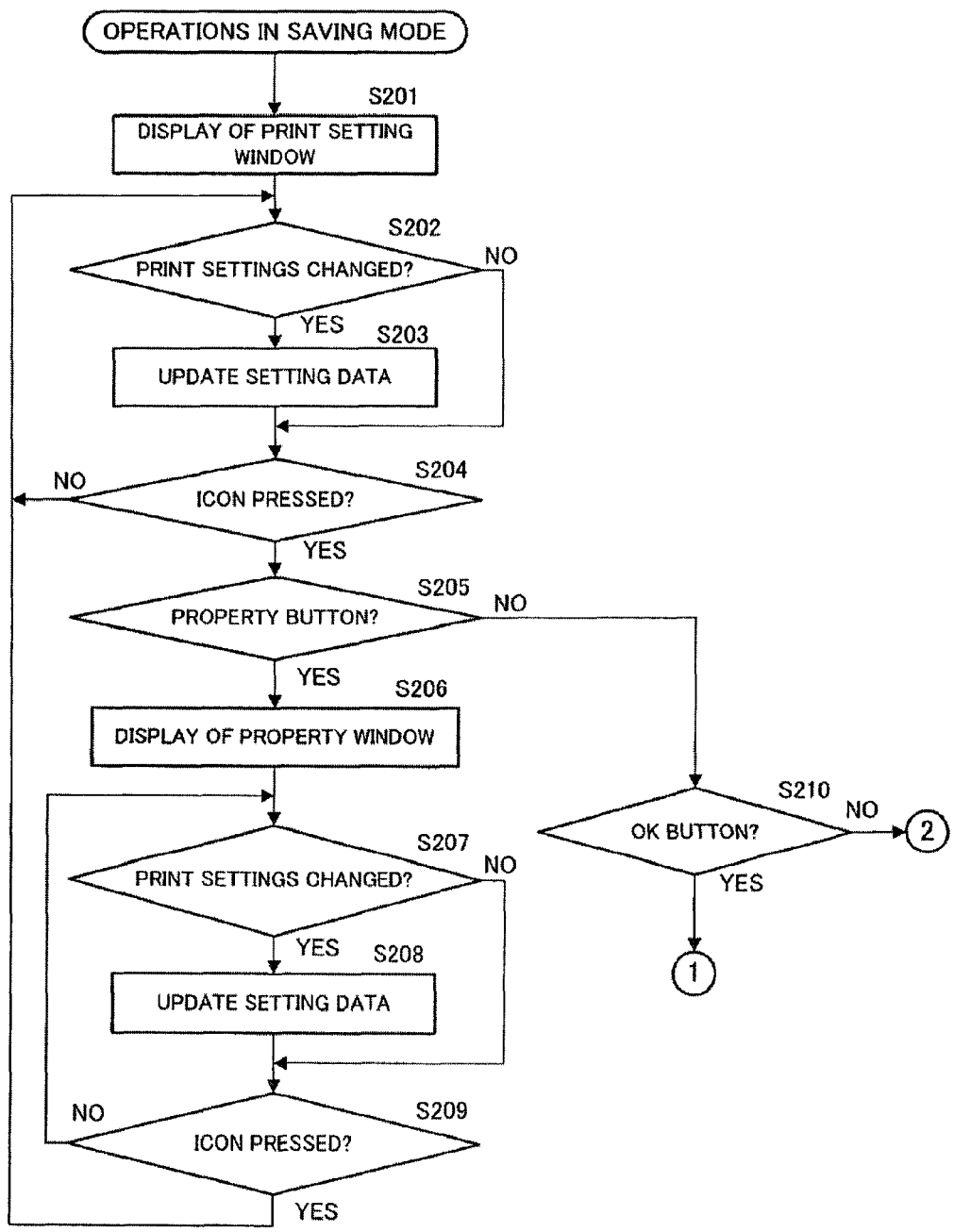
FIG. 7 is a flow chart illustrating an example of operations of the terminal device 20 of FIG. 4 in the saving print mode.
Figure 8:
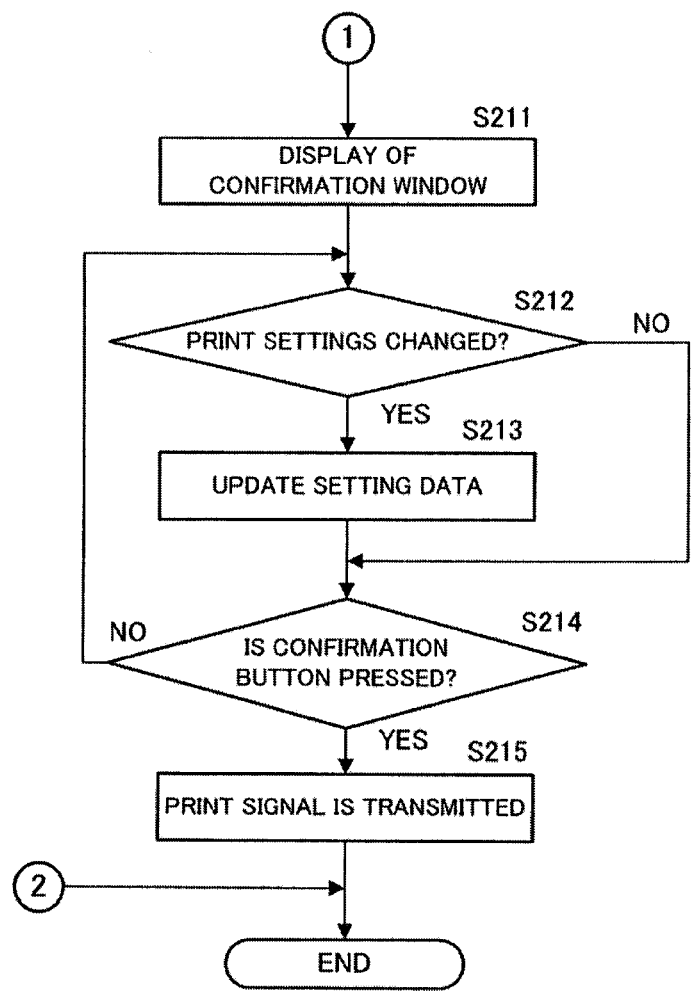
FIG. 8 is a flow chart illustrating an example of operations of the terminal device 20 of FIG. 4 in the saving print mode.

Flow charts of steps S201 through S215 of FIGS. 7 and 8 illustrate an example of operations of the terminal device 20 of FIG. 4 in the saving print mode. The process of steps S201 through step S210 in the print setting process is the same as that of steps S101 through step S110 in the normal print mode. In step S210, if the cancel buttons 31 or 35 on the print setting window 30 is pressed, the print setting determine unit 132 invalidates information of the print settings changed during the time between when the print setting window 30 is displayed and when the cancel buttons 31 or 35 is pressed, and the print setting process ends.

By contrast, if the print start button 34 on the print setting window 30 is pressed, the confirmation window display unit 123 displays the confirmation window 60 (step S211). Next, if the print settings are changed on the confirmation window 60, the print setting determine unit 132 updates the setting data (steps S212, S213).

The print setting determine unit 132 repeats the process of steps S212 and S213 until the confirmation button 70 on the confirmation window 60 is pressed (S214). When the confirmation button 70 is pressed, the print setting determine unit 132 determines the print settings, and the print signal is transmitted (S215).

According to the embodiment, since whether the confirmation window 60 is displayed or not is determined based on the standard mode information, it is possible for the user to recognize whether the MFP 10 is in the saving print mode or not based on the display of the confirmation window 60 when the print start button 34 is pressed. Accordingly, it is possible to prevent the MFP 10 from performing printing when the user is not aware that the MFP 10 is in the saving print mode.

Further, since print settings for a print signal is determined in response to the user pressing the print setting change button 69 on the confirmation window 60, it is also possible to easily change the print settings when the user notices the existing saving print mode.

Embodiment 2

In Embodiment 1, an example has been described in which the confirmation window 60 is displayed based on the standard mode information obtained from the MFP 10 and a user input through the print start button 34 on the print setting window 30. By contrast, a case in which the confirmation window 60 is displayed based on a display history of the property window 40 will be described in this embodiment.

Figure 9:
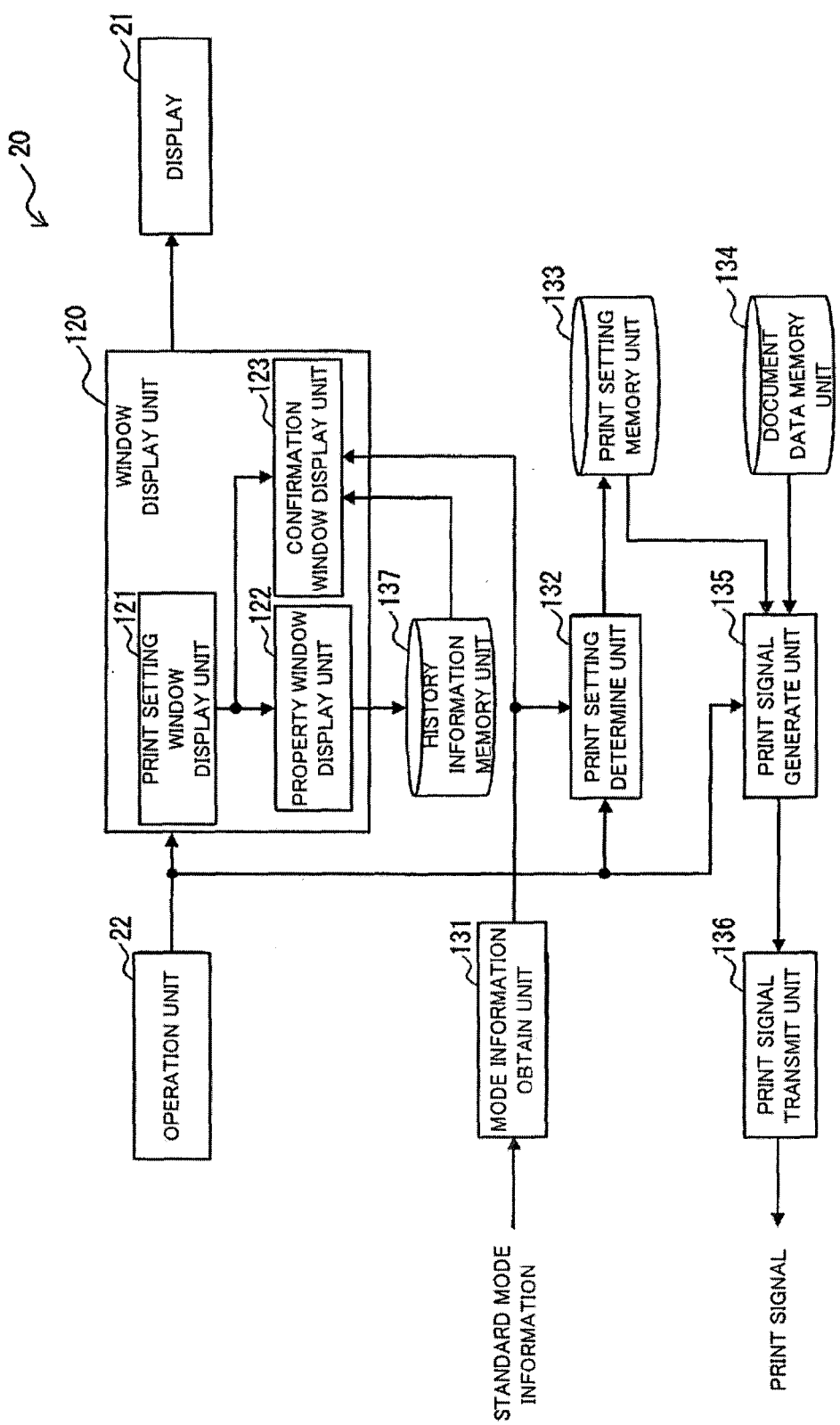
FIG. 9 is a block diagram illustrating an example of another configuration of the terminal device 20 which operates based on a computer program according to Embodiment 2 of the present invention.

FIG. 9 is a block diagram illustrating an example of another configuration of the terminal device 20 which operates based on a computer program according to Embodiment 2 of the present invention. The terminal device 20 includes a history information memory unit 137, which is the difference between the terminal devices 20 of FIG. 9 and FIG. 4.

The history information memory unit 137 maintains a display history of the property window 40 and a change history of print settings. The confirmation window display unit 123 determines whether to display the confirmation window 60 or not based on the display history of the property window 40 during the time between when the print setting window 30 is displayed and when the print start button 34 is pressed.

More specifically, the confirmation window display unit 123 does not display the confirmation window 60 even when the MFP 10 is in the saving print mode if the property window 40 had been displayed by the time the print start button 34 is pressed after the print setting window 30 is displayed. In other words, the confirmation window 60 is displayed only if the property window 40 is not displayed during the time between when the print setting window 30 is displayed and when the print start button 34 is pressed while the MFP 10 is in the saving print mode.

Further, the confirmation window display unit 123 displays the confirmation window 60 based on the change history of print settings. For example, if print settings for saving printing have been changed before the current print setting window 30 is displayed, the confirmation window display unit 123 displays the confirmation window 60 in a way that a user can easily recognize that the contents of the print settings have been changed.

The print setting determine unit 132 does not allow changes on the confirmation window 60 to be made to the print settings which have been changed before the current print setting window 30 is displayed, while allowing changes only to the print settings which have not been changed.

Figure 10:
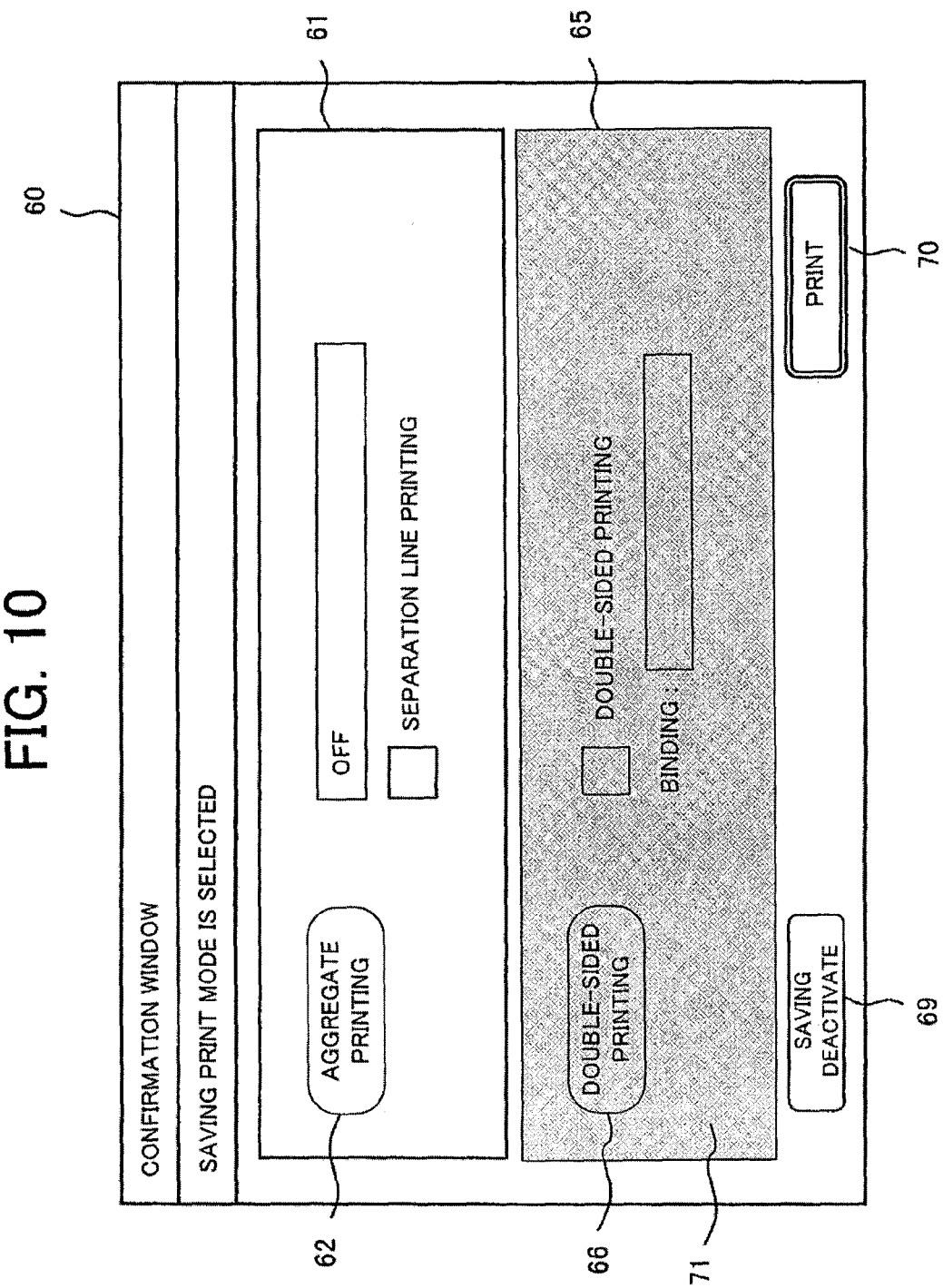
FIG. 10 illustrates an example of operations of the terminal device 20 of FIG. 9 during printing, and illustrates the confirmation window 60 when print settings in the saving printing mode have been changed.

FIG. 10 is a diagram illustrating an example of operations of the terminal device 20 of FIG. 9 during printing, and illustrates the confirmation window 60 when the print settings for the saving printing have been changed previously. In the confirmation window 60, the display field 65 for the double-sided print settings is displayed with a shaded display 71. This means that the double-sided print settings have been changed before the current print setting window 30 is displayed, and the display 65 related to the changed print settings is displayed recognizably. The contents of the print settings in the shaded display 71 can be confirmed, yet, cannot be changed.

<Appearing Pattern of Confirmation Window>

FIG. 11 is a diagram illustrating an example of operations of the terminal device 20 of FIG. 9 during printing, and illustrates an appearing pattern indicating whether the confirmation window 60 is displayed or not when the print start button 34 is pressed.

Whether to display the confirmation window 60 or not is determined based on the print mode and the display history of the setting change window such as the property window 40. If the print mode is the normal print mode, the confirmation window 60 is not displayed even when the print start button 34 on the print setting window 30 is pressed, and the print signal is immediately transmitted.

If the print mode is the saving print mode, whether to display the confirmation window 60 or not is determined based on whether there is a display history of the setting change window. In other words, if the setting change window has been displayed by the time the print start button 34 is pressed after the print setting window 30 is displayed, the confirmation window 60 would not be displayed, and the print signal is immediately transmitted.

By contrast, if the setting change window has not been displayed by the time the print start button 34 is pressed after the print setting window 30 is displayed, the confirmation window 60 would be displayed.

Displayed contents of the confirmation window 60 differ according to whether there is a change history of print settings. That is, if print settings of some entries for the saving printing have been changed before the current print setting window 30 is displayed, the changed print settings of these entries can no longer be changed, and are displayed in a recognizable way indicating that the print settings of these entries cannot be changed. For example, the print settings of these entries are displayed with the shaded display 71.

In this case, within the aggregate printing and the double-sided printing, since there is a change history only in the print settings related to the double-sided printing, the setting contents of the aggregate printing are displayed normally while the setting contents of the double-sided printing are displayed with the shaded display 71.

By contrast, if there has been no change in the print settings, all settings are allowed to be changed. When the confirmation button 70 on the confirmation window 60 is pressed while the confirmation window 60 is displayed, the print signal is transmitted.

While an example has been described in which the print settings of some entries are displayed with the shaded display 71 when the print settings of these entries have been changed, the present invention is not limited to this. For example, as long as entries of the print settings which can be changed and entries which cannot be changed may be visually distinguished from each other, another display such as a gray-out display may be used instead. While an example has been described in which the confirmation window 60 is displayed when the print settings of only some entries have been changed, the present invention may be configured such that the confirmation window 60 is not displayed if the print settings of all the entries for the saving printing have been changed.

A flow chart of steps S301 through S310 of FIG. 12 illustrates an example of operations of the terminal device 20 of FIG. 9 in the saving print mode. In the print setting process, the process between when the print setting window 30 is displayed and when the print start button 34 on the print setting window 30 is pressed is the same as that from steps S101 to S110 in the normal print mode.

The confirmation window display unit 123 does not display the confirmation window 60 if there is a display history of the property window 40 when the print start button 34 on the print setting window 30 is pressed, and the print signal is immediately transmitted (steps S301, S310). By contrast, the print setting determine unit 132 allows print settings for the aggregate printing to be changed if there is neither a display history of the property window 40 by the time the print start button 34 is pressed after the print setting window 30 is displayed, nor any previously changed settings for the aggregate printing (steps S301 through S303).

Further, the print setting determine unit 132 allows print settings for the double-sided printing to be changed if there is no settings previously changed for the double-sided printing (steps S304, S305). The confirmation window display unit 123 displays the confirmation window 60 based on the change-allowed information of the print settings by the print setting determine unit 132 (step S306). Next, the print setting determine unit 132 updates the setting data if the print settings are changed on the confirmation window 60 (step S307, S308).

The print setting determine unit 132 repeats the process of steps S307 and S308 until the confirmation button 70 on the confirmation window 60 is pressed (step S309). The print setting determine unit 132 determines the print settings when the confirmation button 70 is pressed, and the print signal is transmitted (step S310).

According to the embodiment, since the property window 40 is displayed based on a user input through the property button 33 on the print setting window 30 and the confirmation window 60 is displayed based on the display history thereof, it is possible to determine whether the confirmation window 60 is to be displayed or not according to the display history of the property window 40. Especially, it is possible to prevent the confirmation window 60 from being displayed, even when a user is aware that the MFP 10 is in the saving print mode through the display of the property window 40.

In Embodiments 1 and 2, while an example has been described in which the print settings are determined and the print signal is transmitted through the confirmation button 70 on the confirmation window 60 after the confirmation window 60 is displayed, the present invention is not limited to this. For example, the present invention may be configured such that, if there is no user operation for a certain period of time after the confirmation window 60 is displayed, the print settings are determined at the time when the certain period of time expires and the print signal is transmitted automatically.

In Embodiments 1 and 2, while an example has been described in which the mode information obtain unit 131 obtains the standard mode information from the MFP 10 at regular time intervals, thereby causing the standard mode information in the terminal device 20 to be updated on a regular basis, the present invention is not limited to this. For example, the standard mode information may also be obtained from the MFP 10 at a given timing, such as when the print setting start button on the application window is pressed, according to the present invention.

While the present invention has been described with respect to preferred embodiments thereof, it will be apparent to those skilled in the art that the disclosed invention may be modified in numerous ways and may assume many embodiments other than those specifically set out and described above. Accordingly, the appended claims are intended to cover all modifications of the present invention that fall within the true spirit and scope of the present invention.

What is claimed is:

1. A non-transitory medium in which a computer program is stored, the computer program being executable by a terminal device configured to transmit a print signal to an image printing device, the computer program causes the terminal device to:
   obtain standard mode information from the image printing device;
   determine whether a confirmation window is to be displayed or not based on the standard mode information;
   when the confirmation window is to be displayed, display the confirmation window including a first print setting change button based on a user operation through a print start button while a print setting window including the print start button is displayed;
   determine print settings for a print signal based on the standard mode information and a user operation through the first print setting change button; and
   generate the print signal having the determined print settings;
   wherein the standard mode information is information representing a print mode selected by the user, the print mode being either a normal print mode including predetermined print settings or a saving print mode including print settings in which less paper is consumed than in the normal print mode;
   wherein the computer program further causes the terminal device to:
   display a setting change window which allows the print settings to be changed, based on a user operation through a second print setting change button arranged on the print setting window; and
   maintain a display history of the displayed setting change window;
   wherein whether the confirmation window is to be displayed or not is determined based on the display history of the setting change window during the time between when the print setting window is displayed and the user operation through the print start button.

2. The medium according to claim 1, wherein the confirmation window is not displayed if the setting change window had been displayed by the time of the user operation through the print start button, after the print setting window is displayed.

3. The medium according to claim 1, wherein the computer program further causes the terminal device to:
   maintain a change history of the print settings;
   wherein the confirmation window is displayed based on the change history.

4. The medium according to claim 1, wherein the displayed confirmation window includes a message indicating that the saving print mode is selected for the image printing device.

5. A terminal device configured to transmit a print signal to an image printing device, comprising:
   a mode information obtaining unit configured to obtain standard mode information from the image printing device;
   a confirmation window displaying unit configured to display a confirmation window including a first print setting change button based on a user operation through a print start button while a print setting window including the print start button is displayed;
   a print setting determining unit configured to determine print settings for a print signal based on the standard mode information and a user operation through the first print setting change button; and
   a print signal generating unit configured to generate the print signal having the print settings determined by the print setting determining unit;
   wherein the standard mode information is information representing a print mode selected by the user, is the print mode being either a normal print mode including predetermined print settings or a saving print mode including print settings in which less paper is consumed than in the normal print mode; and
   the confirmation window displaying unit determines whether to display the confirmation window or not based on the standard mode information; and
   a setting change window displaying unit configured to display a setting change window which allows the print settings to be changed, based on a user operation through a second print setting change button arranged on the print setting window; and
   a display history storing unit configured to store a display history of the displayed setting change window;
   wherein the confirmation window displaying unit determines whether to display the confirmation window or not based on the display history of the setting change window during the time between when the print setting window is displayed and the user operation through the print start button.

6. The terminal device according to claim 5, wherein the confirmation window displaying unit does not display the confirmation window if the setting change window had been displayed by the time of the user operation through the print start button, after the print setting window is displayed.

7. The terminal device according to claim 5 further including:
a change history storing unit configured to storing a change history of the print settings,
wherein the confirmation window displaying unit displays the confirmation window based on the change history.

8. The terminal device according to claim 5, wherein the displayed confirmation window includes a message indicating that the saving print mode is selected for the image printing device.

9. An image printing method performed by a terminal device configured to transmit a print signal to an image printing device, the method comprising:
obtaining standard mode information from the image printing device;
determining whether a confirmation window is to be displayed or not based on the standard mode information;
when the confirmation window is to be displayed, displaying a confirmation window including a first print setting change button based on a user operation through a print start button while a print setting window including the print start button is displayed;
determining print settings for a print signal based on the standard mode information and a user operation through the first print setting change button; and
generating the print signal having the determined print settings ;
wherein the standard mode information is information representing a print mode selected by the user, is the print mode being either a normal print mode including predetermined print settings or a saving print mode including paper settings in which less paper is consumed than in the normal print mode; and
displaying a setting change window which allows the print settings to be changed, based on a user operation through a second print setting change button arranged on the print setting change window: and
maintaining a display history of the displayed setting change window;
wherein whether the confirmation window is to be displayed or not is determined based on the display history of the setting change window during the time between when the print setting window is displayed and the user operation through the print start button.

10. The image printing method according to claim 9, wherein the confirmation window is not displayed if the setting change window had been displayed by the time of the user operation through the print start button, after the print setting window is displayed.

11. The image printing method according to claim 9 further including:
maintaining a change history of the print settings;
wherein the confirmation window is displayed based on the change history.

12. The image printing method according to claim 9, wherein the displayed confirmation window includes a message indicating that the saving print mode is selected for the image printing device.

* * * * *